United States Patent
Martinez Del Corral et al.

(10) Patent No.: US 10,372,310 B2
(45) Date of Patent: Aug. 6, 2019

(54) SUPPRESSION OF INPUT IMAGES

(71) Applicant: Microsoft Technology Licensing, LLC, Redmond, WA (US)

(72) Inventors: David Martinez Del Corral, Orpington (GB); Alice Elizabeth Rosam, London (GB); Vladyslav Kolesnyk, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 15/257,633

(22) Filed: Sep. 6, 2016

(65) Prior Publication Data

US 2017/0371522 A1   Dec. 28, 2017

(30) Foreign Application Priority Data

Jun. 23, 2016  (GB) .................................. 1610984.5

(51) Int. Cl.
*G06F 17/27* (2006.01)
*G06F 3/023* (2006.01)
*G06F 3/0484* (2013.01)
*G06F 3/0488* (2013.01)
*G06F 17/00* (2019.01)

(52) U.S. Cl.
CPC ........ *G06F 3/04842* (2013.01); *G06F 3/0236* (2013.01); *G06F 3/0237* (2013.01); *G06F 3/04883* (2013.01); *G06F 3/04886* (2013.01); *G06F 17/273* (2013.01); *G06F 17/276* (2013.01)

(58) Field of Classification Search
CPC .. G06F 3/0482; G06F 3/04886; G06F 3/0237; G06F 17/276; G06F 17/273
See application file for complete search history.

(56) References Cited

U.S. PATENT DOCUMENTS

| | | | |
|---|---|---|---|
| 4,852,173 | A | 7/1989 | Bahl et al. |
| 4,872,122 | A | 10/1989 | Altschuler et al. |
| 5,467,425 | A | 11/1995 | Lau et al. |
| 5,477,451 | A | 12/1995 | Brown et al. |
| 5,612,690 | A | 3/1997 | Levy |
| 5,671,426 | A | 9/1997 | Armstrong, III |

(Continued)

FOREIGN PATENT DOCUMENTS

| | | |
|---|---|---|
| CN | 1703664 A | 11/2005 |
| CN | 101034390 A | 9/2007 |

(Continued)

OTHER PUBLICATIONS

"What is Emoji Prediction?", Published on: Nov. 19, 2014 Available at: https://blog.swiftkey.com/what-is-emoji-prediction/.

(Continued)

*Primary Examiner* — Quoc A Tran
(74) *Attorney, Agent, or Firm* — Schwegman Lundberg & Woessner, P.A.

(57) ABSTRACT

A computing device is described which has a memory storing at least one indicator of image use; a user interface which receives user input; and a processor configured to trigger prediction, from the user input, of a plurality of candidate images for input to the computing device. The processor is configured to at least partially suppress the prediction of the plurality of images using the indicator of image use.

8 Claims, 8 Drawing Sheets

(56) References Cited

U.S. PATENT DOCUMENTS

| | | |
|---|---|---|
| 5,680,511 A | 10/1997 | Baker et al. |
| 5,768,603 A | 6/1998 | Brown et al. |
| 5,797,098 A | 8/1998 | Schroeder et al. |
| 5,805,832 A | 9/1998 | Brown et al. |
| 5,805,911 A | 9/1998 | Miller |
| 5,806,021 A | 9/1998 | Chen et al. |
| 5,896,321 A | 4/1999 | Miller et al. |
| 5,952,942 A | 9/1999 | Balakrishnan et al. |
| 5,963,671 A | 10/1999 | Comerford et al. |
| 6,009,444 A | 12/1999 | Chen |
| 6,011,554 A | 1/2000 | King et al. |
| 6,052,657 A | 4/2000 | Yamron et al. |
| 6,054,941 A | 4/2000 | Chen |
| 6,101,275 A | 8/2000 | Coppersmith et al. |
| 6,104,989 A | 8/2000 | Kanevsky et al. |
| 6,125,342 A | 9/2000 | Selesky |
| 6,167,377 A | 12/2000 | Gillick et al. |
| 6,182,027 B1 | 1/2001 | Nasukawa et al. |
| 6,204,848 B1 | 3/2001 | Nowlan et al. |
| 6,219,632 B1 | 4/2001 | Schumacher et al. |
| 6,236,958 B1 | 5/2001 | Lange et al. |
| 6,253,169 B1 | 6/2001 | Apte et al. |
| 6,269,353 B1 | 7/2001 | Sethi et al. |
| 6,275,792 B1 | 8/2001 | Lewis |
| 6,286,064 B1 | 9/2001 | King et al. |
| 6,307,548 B1 | 10/2001 | Flinchem et al. |
| 6,307,549 B1 | 10/2001 | King et al. |
| 6,317,735 B1 | 11/2001 | Morimoto |
| 6,321,192 B1 | 11/2001 | Houchin et al. |
| 6,327,561 B1 | 12/2001 | Smith et al. |
| 6,362,752 B1 | 3/2002 | Guo et al. |
| 6,377,965 B1 | 4/2002 | Hachamovitch et al. |
| 6,393,399 B1 | 5/2002 | Even |
| 6,405,060 B1 | 6/2002 | Schroeder et al. |
| 6,442,561 B1 | 8/2002 | Gehrke et al. |
| 6,460,015 B1 | 10/2002 | Hetherington et al. |
| 6,484,136 B1 | 11/2002 | Kanevsky et al. |
| 6,490,549 B1 | 12/2002 | Ulicny et al. |
| 6,519,557 B1 | 2/2003 | Emens et al. |
| 6,523,134 B2 | 2/2003 | Korenshtein |
| 6,573,844 B1 | 6/2003 | Venolia et al. |
| 6,625,600 B2 | 9/2003 | Lyudovyk et al. |
| 6,643,660 B1 | 11/2003 | Miller et al. |
| 6,671,670 B2 | 12/2003 | Levin et al. |
| 6,724,936 B1 | 4/2004 | Riemer |
| 6,778,958 B1 | 8/2004 | Nishimura et al. |
| 6,813,616 B2 | 11/2004 | Simpson et al. |
| 6,889,219 B2 | 5/2005 | Epstein et al. |
| 6,901,364 B2 | 5/2005 | Nguyen et al. |
| 6,911,608 B2 | 6/2005 | Levy |
| 6,917,910 B2 | 7/2005 | Itoh et al. |
| 6,925,433 B2 | 8/2005 | Stensmo |
| 6,941,287 B1 | 9/2005 | Vaidyanathan et al. |
| 6,944,329 B2 | 9/2005 | Yoshii |
| 6,963,831 B1 | 11/2005 | Epstein |
| 6,963,870 B2 | 11/2005 | Heckerman |
| 6,965,856 B1 | 11/2005 | Stuermer |
| 6,993,476 B1 | 1/2006 | Dutta et al. |
| 7,003,490 B1 | 2/2006 | Keyes |
| 7,075,520 B2 | 7/2006 | Williams |
| 7,092,870 B1 | 8/2006 | Chen et al. |
| 7,098,896 B2 | 8/2006 | Kushler et al. |
| 7,129,932 B1 | 10/2006 | Klarlund et al. |
| 7,175,438 B2 | 2/2007 | Levy |
| 7,187,365 B2 | 3/2007 | Harman |
| 7,218,249 B2 | 5/2007 | Chadha |
| 7,222,067 B2 | 5/2007 | Glushnev et al. |
| 7,251,367 B2 | 7/2007 | Zhai |
| 7,251,639 B2 | 7/2007 | Bernhardt et al. |
| 7,269,546 B2 | 9/2007 | Stensmo |
| 7,366,666 B2 | 4/2008 | Balchandran et al. |
| 7,395,081 B2 | 7/2008 | Bonnelykke Kristensen et al. |
| 7,426,505 B2 | 9/2008 | Simpson et al. |
| 7,453,439 B1 | 11/2008 | Kushler et al. |
| 7,475,010 B2 | 1/2009 | Chao |
| 7,487,461 B2 | 2/2009 | Zhai et al. |
| 7,562,016 B2 | 7/2009 | Balchandran et al. |
| 7,580,829 B2 | 8/2009 | James et al. |
| 7,610,189 B2 | 10/2009 | Mackie |
| 7,610,191 B2 | 10/2009 | Gao et al. |
| 7,706,616 B2 | 4/2010 | Kristensson et al. |
| 7,720,682 B2 | 5/2010 | Stephanick et al. |
| 7,750,891 B2 | 7/2010 | Stephanick et al. |
| 7,809,575 B2 | 10/2010 | Ativanichayaphong et al. |
| 7,814,088 B2 | 10/2010 | Simpson et al. |
| 7,843,427 B2 | 11/2010 | Ording et al. |
| 7,900,142 B2 | 3/2011 | Baer |
| 7,904,298 B2 | 3/2011 | Rao |
| 7,912,700 B2 | 3/2011 | Bower et al. |
| 7,920,132 B2 | 4/2011 | Longe et al. |
| 7,953,692 B2 | 5/2011 | Bower et al. |
| 7,996,211 B2 | 8/2011 | Gao et al. |
| 8,010,343 B2 | 8/2011 | Agapi et al. |
| 8,032,358 B2 | 10/2011 | Helletzgruber et al. |
| 8,036,878 B2 | 10/2011 | Assadollahi |
| 8,073,698 B2 | 12/2011 | Ativanichayaphong et al. |
| 8,074,172 B2 | 12/2011 | Kocienda et al. |
| 8,117,144 B2 | 2/2012 | Angell et al. |
| 8,136,050 B2 | 3/2012 | Sacher et al. |
| 8,200,487 B2 | 6/2012 | Peters et al. |
| 8,225,203 B2 | 7/2012 | Unruh |
| 8,232,973 B2 | 7/2012 | Kocienda et al. |
| 8,289,283 B2 | 10/2012 | Kida et al. |
| 8,299,943 B2 | 10/2012 | Longe |
| 8,516,367 B2 | 8/2013 | Archer |
| 8,605,039 B2 | 12/2013 | Danielsson et al. |
| 8,713,432 B2 | 4/2014 | Assadollahi |
| 8,756,527 B2 | 6/2014 | Paasovaara |
| 8,812,972 B2 | 8/2014 | Bangalore |
| 9,152,219 B2 | 10/2015 | Dai et al. |
| 9,331,970 B2 | 5/2016 | Yuen et al. |
| 9,424,246 B2 | 8/2016 | Spencer et al. |
| 9,659,002 B2 | 5/2017 | Medlock et al. |
| 2002/0045463 A1 | 4/2002 | Chen et al. |
| 2002/0077808 A1 | 6/2002 | Liu et al. |
| 2002/0091520 A1 | 7/2002 | Endo et al. |
| 2002/0111806 A1 | 8/2002 | Franz et al. |
| 2002/0126097 A1 | 9/2002 | Savolainen |
| 2002/0156627 A1 | 10/2002 | Itoh et al. |
| 2002/0188448 A1 | 12/2002 | Goodman et al. |
| 2002/0196163 A1 | 12/2002 | Bradford et al. |
| 2003/0011574 A1 | 1/2003 | Goodman |
| 2003/0023420 A1 | 1/2003 | Goodman |
| 2003/0046073 A1 | 3/2003 | Mori et al. |
| 2003/0073451 A1 | 4/2003 | Kraft |
| 2003/0093263 A1 | 5/2003 | Chen et al. |
| 2003/0182279 A1 | 9/2003 | Willows |
| 2003/0234821 A1 | 12/2003 | Pugliese |
| 2004/0002879 A1 | 1/2004 | Bernhardt et al. |
| 2004/0083198 A1 | 4/2004 | Bradford et al. |
| 2004/0136564 A1 | 7/2004 | Roeber et al. |
| 2004/0153975 A1 | 8/2004 | Williams et al. |
| 2004/0156562 A1 | 8/2004 | Mulvey et al. |
| 2004/0201607 A1 | 10/2004 | Mulvey et al. |
| 2004/0243393 A1 | 12/2004 | Wang |
| 2005/0017954 A1 | 1/2005 | Kay et al. |
| 2005/0044495 A1 | 2/2005 | Lee et al. |
| 2005/0060138 A1 | 3/2005 | Wang et al. |
| 2005/0114770 A1 | 5/2005 | Sacher et al. |
| 2005/0162395 A1 | 7/2005 | Unruh |
| 2005/0190970 A1 | 9/2005 | Griffin |
| 2005/0200609 A1 | 9/2005 | Van Der Hoeven |
| 2005/0270270 A1 | 12/2005 | Chadha |
| 2005/0283724 A1 | 12/2005 | Griffin |
| 2006/0036428 A1 | 2/2006 | Ramsey |
| 2006/0047498 A1 | 3/2006 | Fux et al. |
| 2006/0142997 A1 | 6/2006 | Jakobsen et al. |
| 2006/0206313 A1 | 9/2006 | Xu et al. |
| 2006/0217144 A1 | 9/2006 | Bonnelykke Kristensen et al. |
| 2006/0247915 A1 | 11/2006 | Bradford et al. |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0290535 A1 | 12/2006 | Thiesson et al. |

(56) References Cited

U.S. PATENT DOCUMENTS

| | | |
|---|---|---|
| 2007/0016572 A1 | 1/2007 | Bates et al. |
| 2007/0033002 A1 | 2/2007 | Dymetman et al. |
| 2007/0046641 A1 | 3/2007 | Lim |
| 2007/0061753 A1 | 3/2007 | Ng et al. |
| 2007/0074131 A1 | 3/2007 | Assadollahi |
| 2007/0076862 A1 | 4/2007 | Chatterjee et al. |
| 2007/0088729 A1 | 4/2007 | Baca et al. |
| 2007/0094024 A1 | 4/2007 | Kristensson et al. |
| 2007/0155369 A1 | 7/2007 | Jobs |
| 2007/0157122 A1 | 7/2007 | Williams |
| 2007/0247436 A1 | 10/2007 | Jacobsen |
| 2008/0040099 A1 | 2/2008 | Wu et al. |
| 2008/0076472 A1 | 3/2008 | Hyatt |
| 2008/0077406 A1 | 3/2008 | Ganong |
| 2008/0091412 A1 | 4/2008 | Strope et al. |
| 2008/0120102 A1 | 5/2008 | Rao |
| 2008/0126075 A1 | 5/2008 | Thorn |
| 2008/0162113 A1 | 7/2008 | Dargan |
| 2008/0168366 A1 | 7/2008 | Kocienda et al. |
| 2008/0189605 A1 | 8/2008 | Kay et al. |
| 2008/0195374 A1 | 8/2008 | Holubar et al. |
| 2008/0195388 A1 | 8/2008 | Bower et al. |
| 2008/0195571 A1 | 8/2008 | Furuuchi et al. |
| 2008/0281583 A1 | 11/2008 | Slothouber et al. |
| 2008/0282154 A1 | 11/2008 | Nurmi |
| 2008/0285857 A1 | 11/2008 | Sharan et al. |
| 2008/0291059 A1 | 11/2008 | Longe |
| 2008/0294982 A1 | 11/2008 | Leung et al. |
| 2008/0310723 A1 | 12/2008 | Manu et al. |
| 2008/0312910 A1 | 12/2008 | Zhang |
| 2009/0006101 A1 | 1/2009 | Rigazio et al. |
| 2009/0009367 A1 | 1/2009 | Hirshberg |
| 2009/0019002 A1 | 1/2009 | Boulis |
| 2009/0058690 A1 | 3/2009 | Scott |
| 2009/0058813 A1 | 3/2009 | Rubanovich et al. |
| 2009/0106695 A1 | 4/2009 | Perry et al. |
| 2009/0150322 A1 | 6/2009 | Bower et al. |
| 2009/0187846 A1 | 7/2009 | Paasovaara |
| 2009/0193334 A1 | 7/2009 | Assadollahi |
| 2009/0210214 A1 | 8/2009 | Qian et al. |
| 2009/0225041 A1 | 9/2009 | Kida et al. |
| 2009/0249198 A1 | 10/2009 | Davis et al. |
| 2009/0271195 A1 | 10/2009 | Kitade et al. |
| 2009/0284471 A1 | 11/2009 | Longe et al. |
| 2009/0313572 A1 | 12/2009 | Paek et al. |
| 2010/0017393 A1 | 1/2010 | Broicher et al. |
| 2010/0031143 A1 | 2/2010 | Rao et al. |
| 2010/0106740 A1 | 4/2010 | Kawauchi |
| 2010/0121870 A1 | 5/2010 | Unruh et al. |
| 2010/0161318 A1 | 6/2010 | Lowles et al. |
| 2010/0171700 A1 | 7/2010 | Sharan et al. |
| 2010/0199176 A1 | 8/2010 | Chronqvist |
| 2010/0208031 A1 | 8/2010 | Lee et al. |
| 2010/0218141 A1 | 8/2010 | Xu et al. |
| 2010/0225599 A1 | 9/2010 | Danielsson et al. |
| 2010/0283736 A1 | 11/2010 | Akabane et al. |
| 2011/0029862 A1 | 2/2011 | Scott et al. |
| 2011/0047456 A1 | 2/2011 | Sharan et al. |
| 2011/0074685 A1 | 3/2011 | Causey et al. |
| 2011/0179032 A1 | 7/2011 | Ceusters et al. |
| 2011/0202836 A1 | 8/2011 | Badger et al. |
| 2012/0010875 A1 | 1/2012 | Helletzgruber et al. |
| 2012/0029910 A1 | 2/2012 | Medlock et al. |
| 2012/0059787 A1 | 3/2012 | Brown et al. |
| 2012/0167009 A1 | 6/2012 | Davidson et al. |
| 2012/0296650 A1 | 11/2012 | Bates et al. |
| 2013/0151508 A1 | 6/2013 | Kurabayashi et al. |
| 2013/0159919 A1 | 6/2013 | Leydon |
| 2014/0088954 A1 | 3/2014 | Shirzadi et al. |
| 2014/0267045 A1 | 9/2014 | Grieves et al. |
| 2014/0297267 A1 | 10/2014 | Spencer et al. |
| 2014/0350920 A1 | 11/2014 | Medlock et al. |
| 2015/0100537 A1* | 4/2015 | Grieves .................. G06N 5/048 706/52 |
| 2015/0149925 A1 | 5/2015 | Weksler et al. |
| 2015/0186362 A1 | 7/2015 | Li et al. |
| 2015/0243279 A1 | 8/2015 | Morse et al. |
| 2015/0317069 A1* | 11/2015 | Clements .............. G06F 3/0237 715/773 |
| 2015/0332088 A1 | 11/2015 | Chembula et al. |
| 2015/0332672 A1 | 11/2015 | Akbacak et al. |
| 2015/0347920 A1 | 12/2015 | Medlock et al. |
| 2016/0085773 A1 | 3/2016 | Chang et al. |
| 2016/0104482 A1 | 4/2016 | Aleksic et al. |
| 2016/0328377 A1 | 11/2016 | Spencer et al. |
| 2017/0220552 A1 | 8/2017 | Medlock et al. |

FOREIGN PATENT DOCUMENTS

| | | |
|---|---|---|
| CN | 101203849 A | 6/2008 |
| CN | 101329614 A | 12/2008 |
| CN | 101496036 A | 7/2009 |
| EP | 0872801 A2 | 10/1998 |
| EP | 1724692 A2 | 11/2006 |
| EP | 2088536 A1 | 8/2009 |
| GB | 2443652 A | 5/2008 |
| WO | 2001050335 A1 | 7/2001 |
| WO | 2008116843 A2 | 10/2008 |
| WO | 2008120033 A1 | 10/2008 |
| WO | 2014150104 A1 | 9/2014 |
| WO | 2015087084 A1 | 6/2015 |
| WO | 2015119605 A1 | 8/2015 |

OTHER PUBLICATIONS

Calimlim, Aldrin, "6 emoji keyboard apps for iOS to help you say more", Published on: Jul. 17, 2015 Available at: http://appadvice.com/appnn/2015/0716-emoji-keyboard-apps-for-ios-to-help-you-say-more.

Cappallo, et al., "Image2Emoji: Zero-shot Emoji Prediction for Visual Media", In Proceedings of the 23rd ACM international conference on Multimedia, Oct. 26, 2015, pp. 1311-1314.

Aoki, et al., "A Method for Automatically Generating the Emotional Vectors of Emoticons Using Weblog Articles", In Proceedings of the 10th WSEAS international conference on Applied computer and applied computational science, Mar. 8, 2011, pp. 132-136.

"International Search Report and Written Opinion Issued in PCT Application No. PCT/US2017/038211", dated Oct. 11, 2017, 12 Pages.

U.S. Appl. No. 15/493,028; Final Office Action; dated Oct. 20, 2017; 11 pages.

U.S. Appl. No. 14/452,887; Non-Final Office Action; dated Oct. 5, 2017; 53 pages.

"Ai.type keyboard Free + Emoji", Retrieved from <<https://web.archive.org/web/20150905230845/https://play.google.com/store/apps/details?id=com.aitype.android>>, May 19, 2015, 31 Pages.

"Non-Final Office Action Issued in U.S. Appl. No. 10/185,663", dated Oct. 3, 2006, 31 Pages.

"Notice of Allowance Issued in U.S. Appl. No. 10/185,663", dated May 1, 2007, 8 Pages.

"Intent to Grant Issued in European Patent Application No. 10725232.2", dated Nov. 6, 2014, 6 Pages.

"Notice of Allowance Issued in European Patent Application No. 10725232.2", dated Jan. 29, 2015, 2 Pages.

"Office Action Issued in European Patent Application No. 10775846.8", dated Aug. 4, 2017, 6 Pages.

"Final Office Action Issued in U.S. Appl. No. 13/262,190", dated May 15, 2015, 16 Pages.

"Final Office Action Issued in U.S. Appl. No. 13/262,190", dated Nov. 4, 2016, 13 Pages.

"Final Office Action Issued in U.S. Appl. No. 13/262,190", dated Feb. 12, 2016, 13 Pages.

"Non-Final Office Action Issued in U.S. Appl. No. 13/262,190", dated Oct. 26, 2015, 12 Pages.

"Non-Final Office Action Issued in U.S. Appl. No. 13/262,190", dated Jul. 18, 2016, 12 Pages.

"Non-Final Office Action Issued in U.S. Appl. No. 13/262,190", dated Jan. 22, 2015, 22 Pages.

(56) References Cited

OTHER PUBLICATIONS

"Notice of Allowance Issued in U.S. Appl. No. 13/262,190", dated Jan. 19, 2017, 15 Pages.
"Corrected Notice of Allowance Issued in U.S. Appl. No. 14/307,308", dated Jun. 3, 2016, 2 Pages.
"Final Office Action Issued in U.S. Appl. No. 14/307,308", dated Nov. 23, 2015, 12 Pages.
"Non Final Office Action Issued in U.S. Appl. No. 14/307,308", dated Aug. 17, 2015, 16 pages.
"Notice of Allowance Issued in U.S. Appl. No. 14/307,308", dated Apr. 25, 2016, 13 Pages.
"Final Office Action Issued in U.S Appl. No. 14/452,887", dated Feb. 21, 2018, 60 Pages.
"Final Office Action Issued in U.S. Appl. No. 14/452,887", dated Sep. 8, 2016, 52 Pages.
"Final Office Action Issued in U.S. Appl. No. 14/452,887", dated Mar. 13, 2015, 45 Pages.
"Non-Final Office Action Issued in U.S. Appl. No. 14/452,887", dated May 6, 2016, 47 pages.
"Non-Final Office Action Issued in U.S. Appl. No. 14/452,887", dated Nov. 5, 2014, 40 Pages.
"Final Office Action Issued in U.S. Appl. No. 15/213,168", dated Nov. 15, 2017, 21 Pages.
"Non-Final Office Action Issued in U.S. Appl. No. 15/213,168", dated Jul. 28, 2017, 16 Pages.
"Non-Final Office Action Issued in U.S. Appl. No. 15/493,028", dated Jul. 10, 2017, 18 Pages.
"Extended Search Report Issued in European Patent Application No. 15155451.6", dated May 12, 2015, 6 Pages.
"First Office Action and Search Report Issued in Chinese Patent Application No. 201080022530.6", dated Dec. 4, 2013, 26 Pages.
"Fourth Office Action Issued in Chinese Patent Application No. 201080022530.6", dated Jul. 13, 2015, 10 Pages.
"Notice of Allowance Issued in Chinese Patent Application No. 201080022530.6", dated Nov. 26, 2015, 3 Pages.
"Second Office Action Issued in Chinese Patent Application No. 201080022530.6", dated Aug. 11, 2014, 25 Pages.
"Third Office Action Issued in Chinese Patent Application No. 201080022530.6", dated Feb. 28, 2015, 27 Pages.
"First Office Action and Search Report Issued in Chinese Patent Application No. 201610080975.9", dated Dec. 14, 2017, 22 Pages.
Almuallim, et al., "Development and Applications of Decision Trees", In the Expert Systems, vol. 1, Jan. 2002, pp. 53-77.
Bellegarda, Jerome R., "Statistical Language Model Adaptation: Review and Perspectives", In Journal of the Speech Communication, vol. 42, Issue 1, Jan. 1, 2004, pp. 93-108.
Bosch, et al., "Efficient Context-sensitive Word Completion for Mobile Devices", In Proceedings of the 10th International Conference on Human Computer Interaction with Mobile Devices and Services, Sep. 2, 2008, pp. 465-470.
Duda, "Pattern Classification", 2nd Edition, Chapter 10, by Wiley-Interscience, Sep. 3, 1997, 41 Pages.

Fayyad, et al., "The Attribute Selection Problem in Decision Tree Generation", In Proceedings of the 10th National Conference on Artificial Intelligence, Jul. 2, 1992, pp. 104-110.
Federico, Marcello, "Efficient Language Model Adaptation Through MDI Estimation", In Proceedings of Sixth European Conference on Speech Communication and Technology, Sep. 5, 1999, 4 Pages.
Florian, et al., "Dynamic Nonlocallanguage Modeling via Hierarchical Topic-Based Adaption", In Proceedings of the 37th Annual Meeting of the Association for Computational Linguistics on Computational Linguistics, Jun. 20, 1999, 9 Pages.
Frederico, Marcello, "Bayesian Estimation Methods for N-Gram Language Model Adaptation", In Proceedings of the Fourth International Conference on Spoken Language, vol. 1, Oct. 3, 1996, 4 Pages.
Giles, et al., "Comparison of Two Families of Entropy-Based Classification Measures With and Without Feature Selection", In Proceedings of the 34th Annual Hawaii International Conference on System Sciences, Jan. 6, 2001.
How, et al., "Optimizing Predictive Text Entry for Short Message Service on Mobile Phones", In Proceedings of International Conference on Hybrid Information Technology (HCII), vol. 5, Jul. 2005, 10 Pages.
Lesher, et al., "Domain-Specific Word Prediction for Augmentative Communication", In Proceedings of RESNA Annual Conference, Jan. 2002, 3 Pages.
Li, et al., "Using Uneven Margins SVM and Perception for Information Extraction", In Proceedings of the 9th Conference on Computational Natural Language Learning, Jun. 29, 2005, pp. 72-79.
Medlock, Ben, W., "Investigating Classification for Natural Language Processing Tasks", In Technical Report No. 721, University of Cambridge, Computer Laboratory, Jun. 2008, 138 Pages.
"International Search Report and Written Opinion Issued in PCT Application No. PCT/GB2010/000622", dated May 8, 2010, 13 Pages.
Silfverberg, et al., "Predicting Text Entry Speed on Mobile Phones", In Proceedings of the SIGCHI conference on Human Factors in Computing Systems, Apr. 1, 2000, pp. 9-16.
Talbot, et al., "Smoothed Bloom Filter Language Models-Tera-Scale LMs on the Cheap", In Proceedings of the Joint Conference on Empirical Methods in Natural Language Processing and Computational Natural Language Learning, Jun. 2007, pp. 468-476.
Trapani, Gina, "Cupcake Adds Camcorder, Touchscreen Keyboard and More to Android", Retrieved from <<https://lifehacker.com/5272021/cupcake-adds-camcorder-touchscreen-keyboard-and-more-to-android>>, May 28, 2009, 5 Pages.
Trnka, et al., "Topic Modeling in Fringe Word Prediction for AAC", In Proceedings of the 11th International Conference on Intelligent User Interfaces, Jan. 29, 2006, 8 Pages.
"Final Office Action Issued in U.S. Appl. No. 15/213,168", dated Aug. 29, 2018, 18 Pages.
"Final Office Action Issued in U.S. Appl. No. 15/213,168", dated Dec. 27, 2018, 11 Pages.
"Second Office Action Issued in Chinese Patent Application No. 201610080975.9", dated Sep. 5, 2018, 6 Pages.

* cited by examiner

SUPPRESSION OF INPUT IMAGES

CROSS-REFERENCE TO RELATED APPLICATION(S)

This non-provisional utility application claims priority to UK patent application number 1610984.5 entitled "SUPPRESSION OF INPUT IMAGES" and filed on Jun. 23, 2016, which is incorporated herein in its entirety by reference.

BACKGROUND

Computing devices, such as mobile phones, portable and tablet computers, wearable computers, head-worn computers, game consoles, and the like are often deployed with soft keyboards for text input and/or other interaction with the computing device. A soft keyboard is one displayed on a screen or other surface and where user input associated with the displayed keys triggers input of text characters to a computing device. When a user operates the soft keyboard the computing device employs text prediction to predict and offer candidate words or phrases to the user and also to predict and offer candidate emoji to the user. The term "emoji" as used herein refers to ideograms, smileys, pictographs, emoticons and other graphic representations. Emoji are often used in place of words or phrases, or in conjunction with words or phrases but this is not essential.

The Unicode (6.0) standard allocates 722 code points as descriptions of emojis (examples include U+1 F60D: Smiling face with heart shaped eyes and U+1 F692: Fire engine). Specified images are used to render each of these Unicode characters so that they may be sent and received. Although it is popular to input emojis, it remains difficult to do so, because the user has to discover appropriate emojis and, even knowing the appropriate emoji, has to navigate through a great number of possible emojis to find the one they want to input.

The embodiments described below are not limited to implementations which solve any or all of the disadvantages of known processes and/or apparatus for inputting images such as emoji to electronic devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device is described which has a memory storing at least one indicator of image use; a user interface which receives user input; and a processor configured to trigger prediction, from the user input, of a plurality of candidate images for input to the computing device. The processor is configured to at least partially suppress the prediction of the plurality of images using the indicator of image use.

In this way it is possible, but not essential, to automatically control whether or not images such as emoji are available as candidates for entry to the computing device by using the at least one indicator. It is also possible, but not essential, to automatically control other factors such as how many images are available as candidates for entry and/or how often images are available as candidates for entry. The user is thus more easily able to enter data into the computing device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
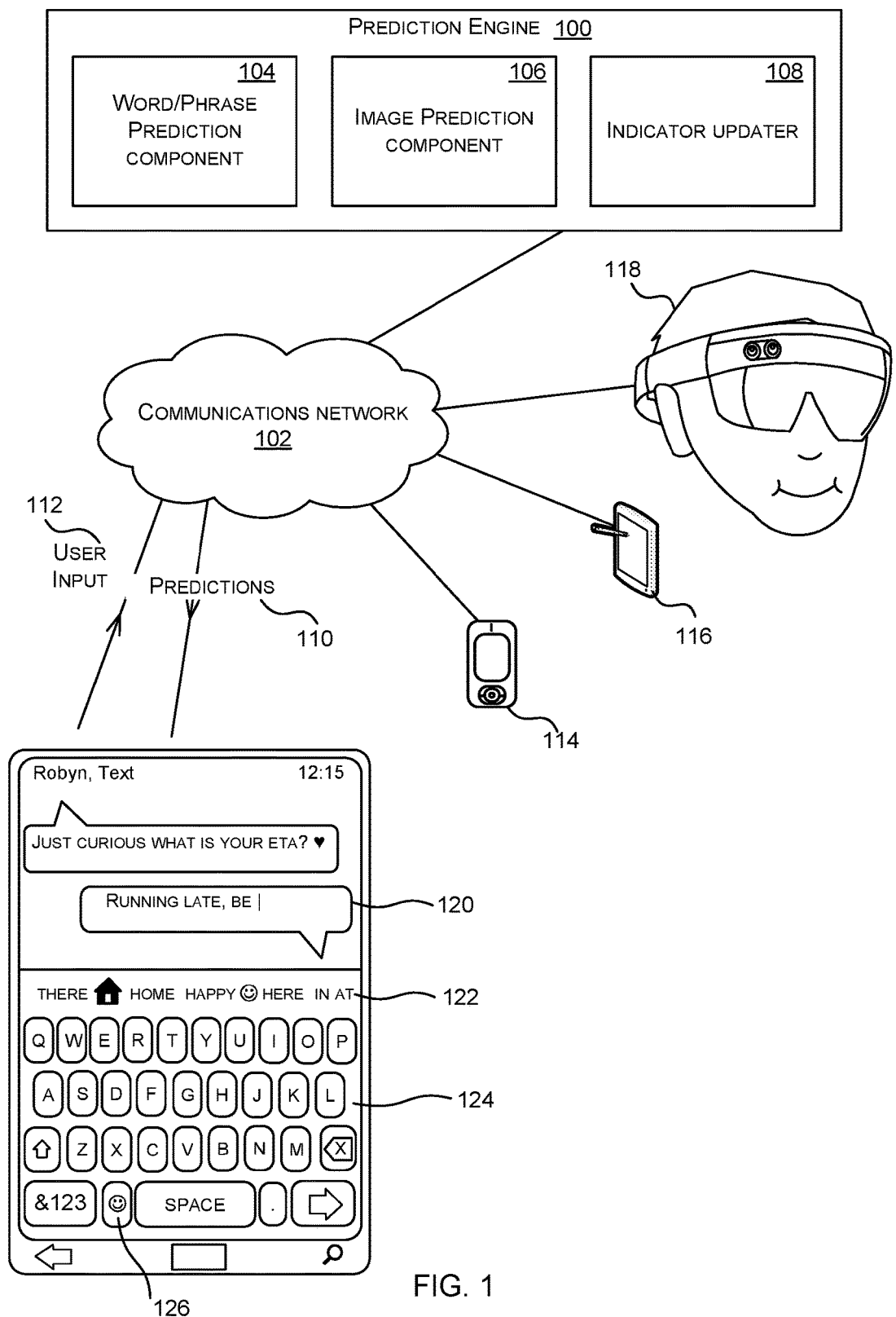
FIG. 1 is a schematic diagram of various end user computing devices having a soft keyboard with image prediction capability and optional word/phrase prediction capability.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In the examples described herein an end user is able to insert relevant images to an electronic device in appropriate situations, and is otherwise not burdened with candidate image predictions in situations when he or she is unlikely to input an image to the computing device. This is achieved in a behind the scenes manner, without the need for manual switching on or off of candidate image prediction functionality by the user. Examples below also describe how the quantity and/or frequency of candidate image predictions available to a user to select from is dynamically adjusted in an automatic manner according to likelihood of a user inputting an image. The computing device has access to one or more indicators of image use and these enable it to assess the likelihood of a user inputting an image.

The indicators of image use are described in more detail below and in summary, an indicator of image use is a measure of how likely a user is to input any image (such as any emoji) to the computing device in a particular situation or context. This is in contrast to a measure of how likely a user is to input a particular image. By using one or more of the indicators the computing device enables more effective input of images. For example, one or more of the indicators are used to suppress candidate image predictions produced by a predictor in situations where the user is unlikely to want to input an image. The suppression occurs automatically so that no manual input is needed from the user to adjust the prediction functionality and the suppression enables resources of the computing device to be allocated to other tasks. In some examples the indicators are learnt as described in more detail below.

Each indicator is a statistical representation of observed image use. For example, an indicator is one or more numerical values, such as a ratio, mean, median, mode, average, variance or other statistic describing observed image use. The indicators are application specific in some examples, that is, they are statistics describing observed image use in conjunction with a particular application executing on the computing device. In some examples the indicators are user specific, that is they are statistics describing observed image use by a particular user. Indicators which are combinations of application specific and user specific are used in some examples. Indicators are used which are any combination of one or more of: application specific, user specific, field specific, enterprise specific, recipient specific, user age group specific, user gender specific, topic specific, population specific, community specific, language specific, geographical region specific, time zone specific, time of year specific.

The indicators are calculated in advance in some cases by observing large amounts of data from large populations of users. In some cases the indicators are dynamically learnt during operation of the end user computing device. The indicators are learnt at the end user computing device and/or at a cloud service computing device or other remote computing device. The indicators are sent between computing devices and in some cases are stored in association with a user profile such that user specific indicators are available through a cloud service to whichever end user device a user is operating.

More detail about how indicators are learnt is given later in the document with reference to FIG. 7.

FIG. 1 is a schematic diagram of a prediction engine 100 deployed as a service for end user computing devices 124, 114, 116, 118 to facilitate image input at the end user computing devices. The term "image" is used to refer to any type of two dimensional graphical representation sized and shaped for insertion amongst text and a non-exhaustive list of examples is: a photograph, a logo, a drawing, an icon, an emoji, an emoticon, a sticker, a pictogram, an ideogram, a cartoon, or any other image sized and shaped for insertion amongst text. In various examples described below the image is an emoji for ease of description, although other types of image may be used.

End user devices such as mobile telephones 124, 114, tablet computers 116, wearable computers 118, laptop computers or other end user electronic devices are connected to a communications network 102 via wired or wireless links. The communications network 102 is the internet, an intranet, or any wired or wireless communications network. Also connected to the communications network is a prediction engine 100 comprising an image prediction component 106 which has been trained to predict, for given user input, a plurality of images which are relevant to the given user input. In some examples the prediction engine 100 also has a word/phrase prediction component 104 which is configured to predict, given user input, text characters, words or phrases, which are likely to follow the given user input. The prediction engine is implemented using any of software, hardware and firmware and has a communications interface arranged to receive user input 112 from an end user computing device 124, 114, 116, 118 and to send one or more predictions 110 to the end user computing devices. The user input 112 is of any type such as speech input, gesture input, keystroke input, touch input, eye movement input, combinations of one or more different types of user input, or other user input.

The prediction engine 100 also comprises an indicator updater 108 in some cases. The indicator updater 108 is described in more detail with reference to FIG. 7 below and it acts to compute one or more indicators of image use from observations. Values of indicators computed by indicator updater 108 are stored at the prediction engine 100 and/or at the end user computing devices.

The predictions comprise images and, in some examples, text characters, words or phrases. In some examples the predictions are ranked according to their probability or likelihood of being relevant to the user input 112. In various examples the quantity and/or frequency of predicted image candidates returned by the prediction engine 100 to an end user device in response to an instance of user input is controlled on the basis of one or more of the indicators. The instance of user input, in the case of text input, is a key stroke, character, phoneme, morpheme, word, phrase, sentence or other unit of text.

Once the end user computing device receives one or more predictions it outputs the predictions. For example, to a panel 122 above a soft keyboard. In the example of FIG. 1 there is a panel 122 of rendered candidate predictions comprising two emojis and six words. In this example a user is operating a messaging application and is forming a message 120 by operating the soft keyboard. The user is able to enter emoji by making selections from the panel 122 rather than opening a separate emoji panel using key 126.

A prediction tool at the end user computing device (or at the prediction engine 100) has access to one or more of the indicators and in some examples is able to suppress the availability of image candidates for user selection. The prediction tool is software, hardware or firmware at the end user computing device and/or at the prediction engine 100. In some examples the prediction tool is configured to control the quantity or the frequency of image candidates for user selection, on the basis of one or more of the indicators.

It is noted that the deployment of FIG. 1 is one example only and that in some examples the prediction engine 100 is integral with the end user computing device 124, 114, 116, 118.

Figure 2:
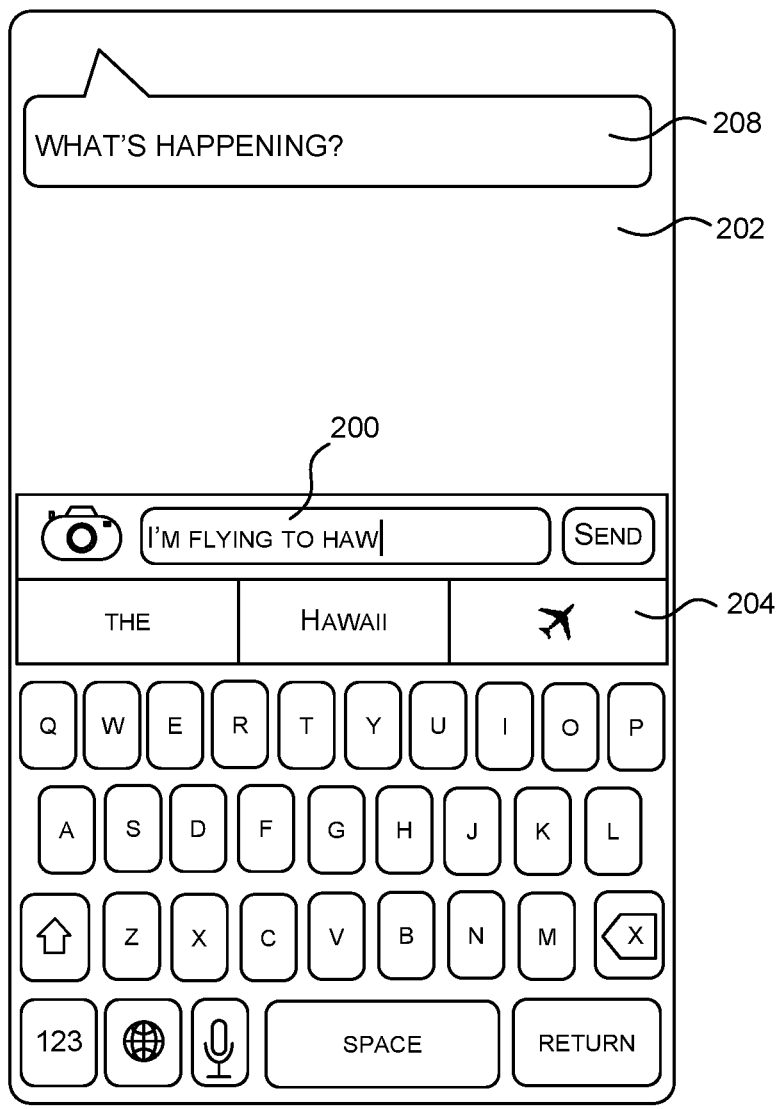
FIG. 2 is a schematic diagram of a mobile telephone touch screen comprising a soft keyboard display with word and emoji prediction candidates.

FIG. 2 is a schematic diagram of a mobile telephone touch screen 202 comprising a soft keyboard display with two word and one emoji prediction candidate 204 available for selection as a result of the user entering text into text box 200 to create a message. In this example three candidates are available at any one time in contrast to the situation in FIG. 1.

Figure 3:
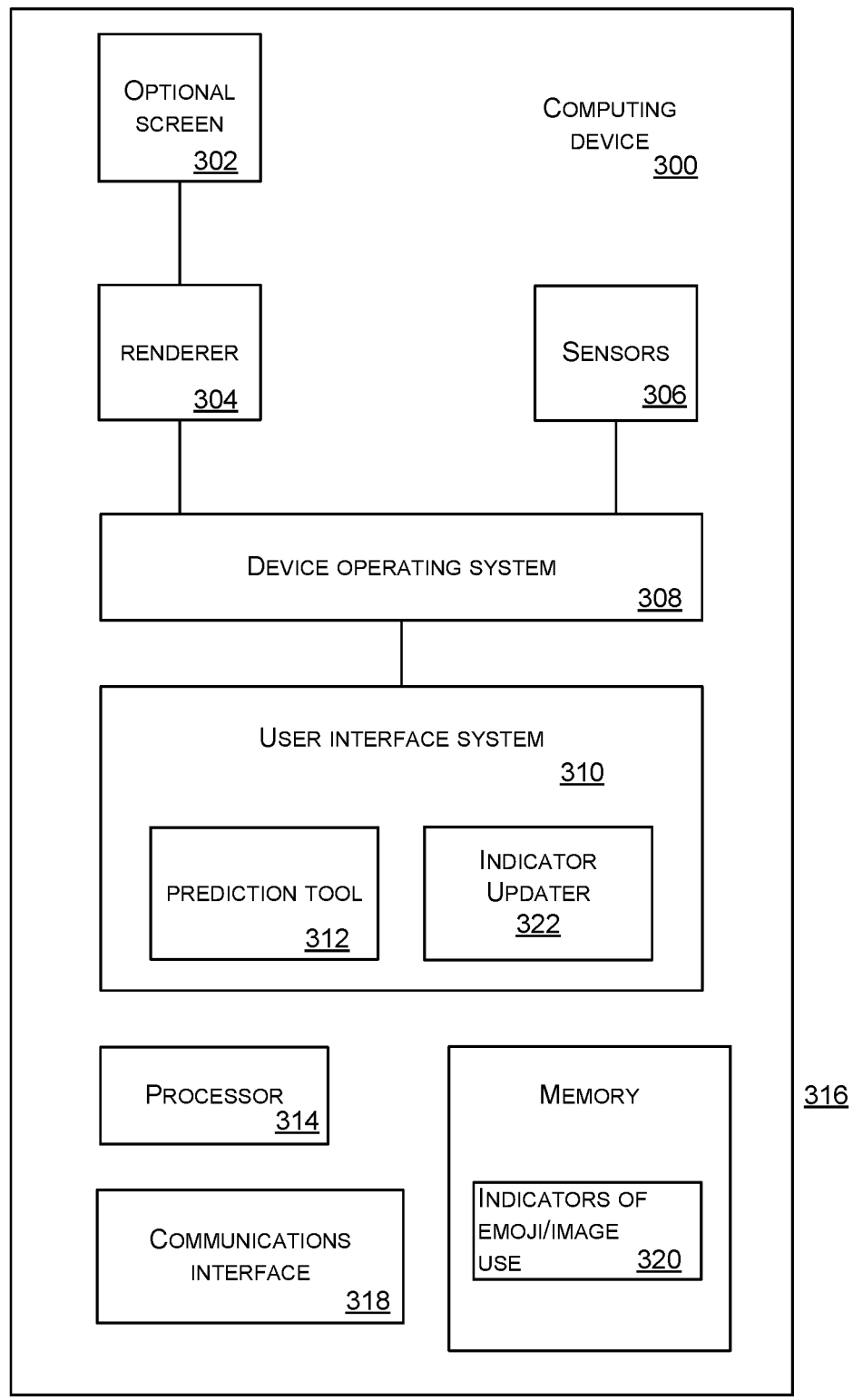
FIG. 3 is a schematic diagram of a computing device such as any of the end user computing devices of FIG. 1.

FIG. 3 is a schematic diagram of an end user computing device such as a wearable computer, augmented reality head worn computer, mobile phone, tablet computer, game console or other end user computing device. A prediction tool 312 is provided within a user interface system 310 which controls a display. The user interface system 310 also comprises an indicator updater 322 which is described in more detail with reference to FIG. 7 below. The prediction tool 312 communicates with prediction engine 100 of FIG. 1 to obtain candidate images and optionally candidate words/phrases. The prediction tool comprises all or part of the prediction engine 100 in some cases. The prediction tool has access to indicators of emoji/image 320 stored at memory 316 and which may be accessed from the prediction engine 100 of FIG. 1. The prediction tool acts to suppress and/or control candidate images available for user selection on the basis of the indicators.

The display is a screen 302 in some cases or a virtual reality or augmented reality display which projects into the environment or into the user's eye in some cases. The computing device 300 has one or more sensors 306 such as a touch screen, a microphone, cameras, or other sensors which detect user input to enable a user to input text and make selections regarding criteria for image input. The sensors provide input to a device operating system 308 which is connected to the user interface system 310. The user interface system implements a soft keyboard at the computing device in some examples where the soft keyboard has prediction capability. The device operating system 308 controls a renderer 304 configured to render graphical content such as a graphical user interface to optional screen 302 or to any other means for displaying graphical content to an end user. The end user computing device 300 has a memory 316 which stores indicators of emoji/image user 320 and optionally other data, one or more processors 316 and a communications interface 318. The end user computing device has various other components which are not illustrated for clarity and are described in more detail below with reference to FIG. 8.

Alternatively, or in addition, the functionality of the prediction tool 312 and indicator updater 322 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Through the use of the prediction engine 100 of FIG. 1 the user does not have the burden of operating an emoji selection panel, in which emojis are organized into several categories which can be scrolled through. Emoji selection panels are complex and time consuming to operate since although the emojis are grouped into categories, the user is still required to search through the emojis of various categories in order to find the emoji they want to use. Some emojis are not easily classified which further exacerbates the problem.

In the examples described herein the user does not have to provide shorthand text that identifies a particular emoji and does not need to type in an exact description of an emoji. In this way the end user is able to insert relevant images to an electronic device with minimal effort.

Figure 4:
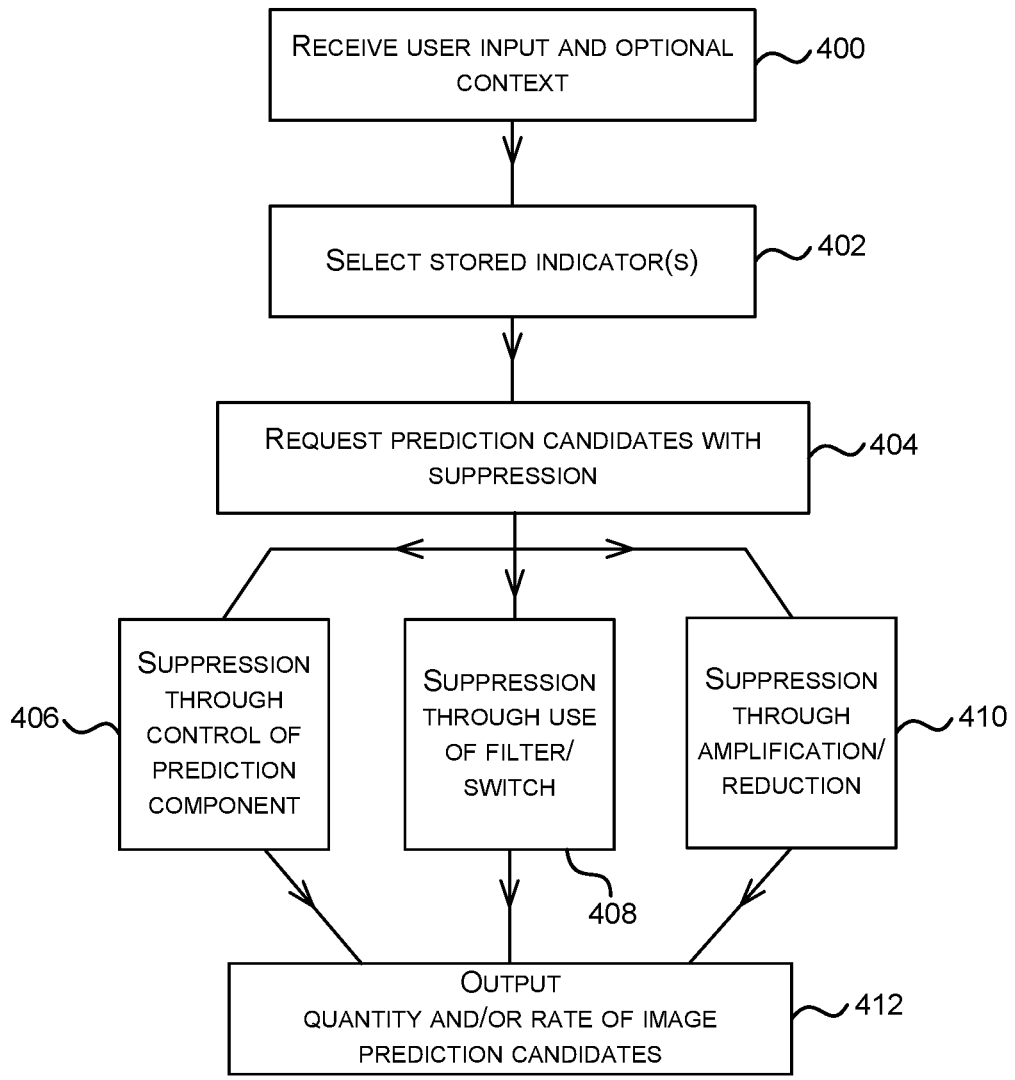
FIG. 4 is a flow diagram of a method at a computing device such as that of FIG. 2 for suppressing input image candidates.

FIG. 4 is a flow diagram of a method of operation at the prediction tool 312 of FIG. 2. The prediction tool receives 400 user input from the user interface system 310. For example, a user types text into a text box such as in the scenario of FIG. 2. The prediction tool 312 also receives optional context about the user input event. A plurality of examples of optional context are now given although these are a non-exhaustive list of examples and are not intended to limit the scope. Combinations of one or more of these examples of context are used in some cases. For example, the context is an identifier of an application currently in focus at the computing device and for which the user is entering user input. For example, the context is time information associated with the event, such as a time of day, day of week etc. For example, the context is an identifier of a recipient of a message which is being created. For example, the context is data about the user and/or the computing device. For example the context is an identifier of a field such as a subject line or a message body, associated with the user input.

The prediction tool 400 selects 402 one or more stored indicators. The stored indicators are available at the computing device (see 320 of FIG. 3) or from the prediction engine. The prediction tool 400 selects the one or more stored indicators by using the context data where it is available. If no context data is available the prediction tool uses one or more default indicators.

The prediction tool 400 requests 404 prediction candidates from the prediction engine 100 using suppression. For example the prediction tool 400 sends a request message to the prediction engine 100 where the request message comprises detail about the user input and also comprises the selected stored indicator(s). The selected stored indicator(s) are used to suppress or control availability of image prediction candidates to the user. This is achieved in any of a variety of different ways illustrated at boxes 406, 408, 410 or hybrids of one or more of these ways.

Suppression through control 406 of the prediction engine is achieved by inputting the selected indicator(s) to the prediction engine 100 together with other inputs based on the user input data such that the output of the prediction engine is modified (as compared with the situation where only the other inputs are made to the prediction engine). For example, the proportion of text predictions and the proportion of image predictions in the total number of predictions is adjusted.

Suppression through use of a filter 408 is achieved by post-processing the output of the prediction engine 100 as described with reference to FIG. 5.

Suppression through amplification or reduction 410 is achieved by post-processing the output of the prediction engine 100 as described with reference to FIG. 6.

After the suppression stage the prediction tool outputs 412 candidate image predictions at a quantity (which may be zero in some cases) and/or a rate (or frequency, such as the number of times candidate images are available over time) influenced by the suppression process. In this way image prediction candidates are available to the user for selection and input to the electronic device as and when they are required. A trade-off between use of display area for text candidate predictions and for image candidate predictions is carefully managed in an automatic manner so that burden on the user is reduced and more efficient and accurate entry of image data (and text data where appropriate) is achieved. Where the total number of candidate predictions available for selection by a user at any one time is a maximum of three, the process of FIG. 4 is particularly beneficial, since it enables optimal use of the extremely limited resources for candidate prediction entry. Using a maximum of three candidate predictions (be they image candidates or word/phrase candidates) has been found to be particularly effective at reducing burden on the user. FIGS. 2 and 6 show examples where a maximum of three candidate predictions are available. In contrast the example in FIG. 1 has more than three candidate predictions available for user selection.

Figure 5:
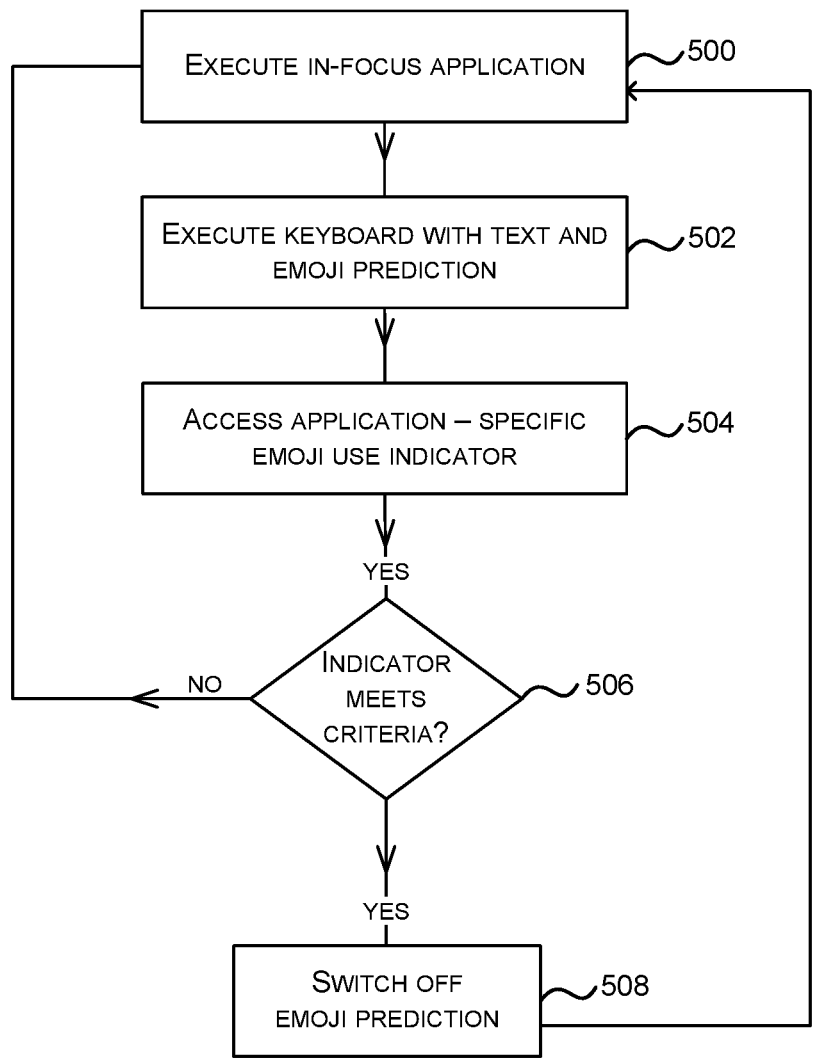
FIG. 5 is a flow diagram of a method of switching emoji prediction capability of a soft keyboard on or off automatically.

FIG. 5 is a flow diagram of a method at a computing device such as an end user computing device of FIG. 1. The computing device is executing one or more applications such as a messaging application and a search application (these are examples and are not intended to limit the scope). One of the executing applications is currently in focus 500 as it is the application which the user is currently using. A soft keyboard is also executing 502 at the computing device in order that the user is able to enter images and optionally also text to the in focus application. The soft keyboard has image prediction capability (such as emoji prediction) and optionally has text prediction capability.

The computing device selects one or more indicators from a store of image use indicators as described above. For example, the computing device uses an identifier of the in-focus application available to it from an operating system of the computing device, to select an image use indicator associated with the application identifier. The prediction tool of the computing device checks 506 if the indicator meets criteria. For example, if the indicator is below a threshold then emojis are rarely observed in use with this application. In this case the prediction tool of the computing device switches off emoji prediction capability of the prediction engine. This is achieved by deactivating part of the prediction engine, or by filtering out emoji predictions generated by the prediction engine. If the indicator does not meet the criteria at check 506 the process repeats.

Figure 6:
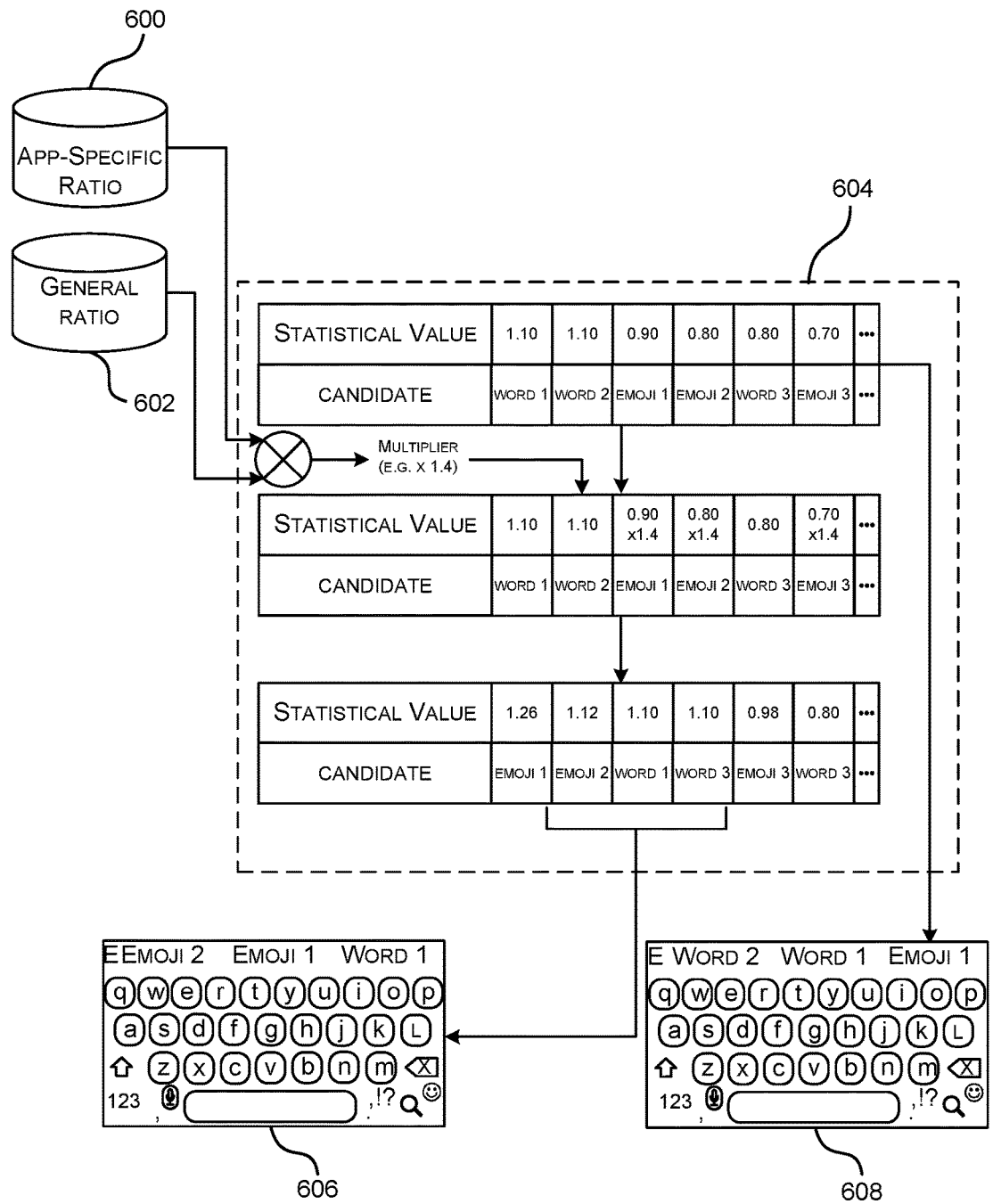
FIG. 6 is a schematic diagram of prediction candidates and a process of multiplying emoji prediction candidates on the basis of stored indicators.

FIG. 6 is an example of using a multiplier to amplify or reduce emoji prediction candidate availability. In this example, two indicators 600, 602 are selected by the prediction engine and these include an application specific ratio 600 and a general ratio 602. However, these are examples only and other indicators may be used.

The application specific ratio 600 is a ratio of the number of image prediction candidates which have been selected in connection with the application to the total number of image prediction candidates which have been available for selection in connection with the application. The general ratio 602 is a ratio of the number of image prediction candidates which have been selected to the total number of image prediction candidates which have been available for selection. The ratios 600, 602 are user specific in some examples although this is not essential.

The prediction engine outputs prediction candidates which are shown in the uppermost table of dotted region 604. In this example there are three word candidates and three emoji candidates and each candidate has an associated statistical value generated by the prediction engine 100. The candidates are ranked in the table according to the statistical values as the statistical values represent likelihood that the candidate will be selected by a user.

The ratios 600, 602 (or other indicator(s)) are combined to form a numerical value called a multiplier. In the example of FIG. 6 the multiplier is 1.4 and is used to magnify the statistical values of the emoji prediction candidates as indicated in the middle table of region 604. The candidates are then re-ranked according to the revised statistical values as indicated in the lowermost table of region 604. By changing the value of the multiplier the statistical values of the emoji are magnified or reduced.

Without use of the magnifier the candidates of the uppermost table produce a keyboard display 608 with the most likely word in the center of the candidate row, and with word 2 and emoji 1 either side of the most likely word, word 1. With use of the magnifier the candidates of the lowermost table produce a keyboard display 608 with the most likely candidate in the center of the candidate row being emoji 1, and with emoji 2 and word 1 either side.

Figure 7:
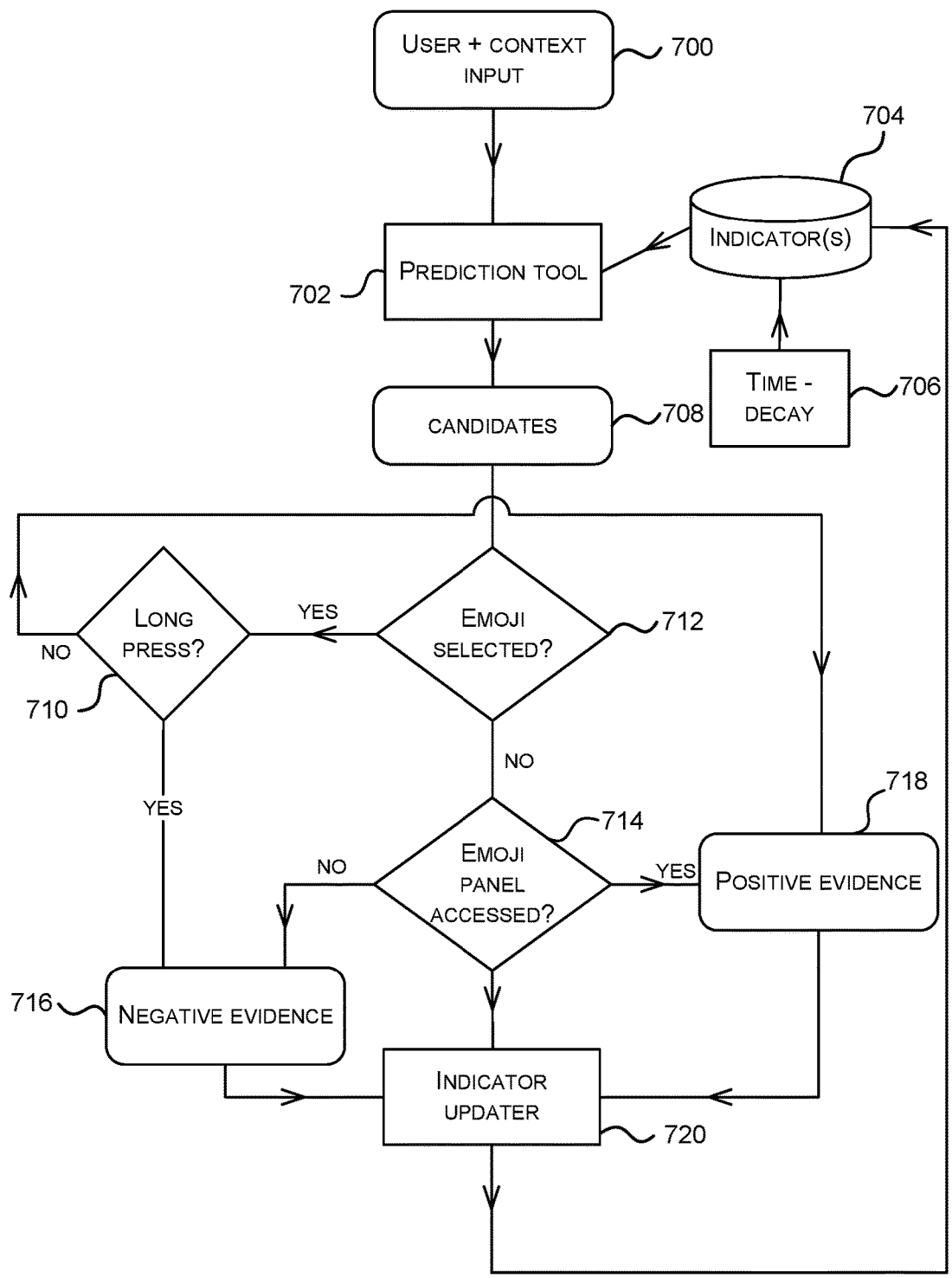
FIG. 7 is a flow diagram of a method of dynamically updating indicators of emoji use.

FIG. 7 is a flow diagram of process at the indicator updater 108. The prediction tool 702 at the end user computing device receives user input 700 and optional context about the user input event (as described above). The prediction tool 702 selects one or more indicators 704 using the context where available and obtains candidate predictions 708 from the prediction engine 100 as explained above. One or more of the candidates are made available to the user for selection. If an emoji candidate is selected 712 with no long press 710 an instance of positive evidence 718 is obtained and used by the indicator updater 720 to update a store of indicators 704. For example, by computing a mean, median, mode, average or other statistic or by storing the instance itself.

If an emoji candidate is selected 712 with a long press 710 (indicating that the emoji is to be blacklisted) then an instance of negative evidence 716 is observed and the indicator updater 720 updates the indicators 704. If no emoji candidate is selected 712 and the user accesses an emoji panel 714, by actively selecting an emoji panel, then an instance of positive evidence is observed and is used by the indicator updater 720 to update the indicators 704. If no emoji is selected 712 and no emoji panel is accessed 714 then an instance of negative evidence 716 is observed and the indicator updater 720 updates the indicators 704 accordingly. The indicator updater uses update rules to update the indicators according to instances of positive or negative evidence. A time decay process 706 is applied to the indicators 704 in some cases to enable changes in user behavior over time to be taken into account.

More detail about the prediction engine 100 of FIG. 1 is now given. In some cases the prediction engine comprises one or more mapping tables which map emoji to corresponding words or phrases. In some examples the mapping tables enable the prediction engine to offer emoji as alternatives for matching or similar words. In addition or alternatively, the prediction engine analyzes emoji as words and generates prediction candidates that include both emoji and words.

The prediction engine 100 comprises a language model in some examples. The prediction engine comprises a search engine in some examples. The prediction engine comprises a classifier in some examples.

An example in which the prediction engine 100 comprises a language model is now described. The prediction engine 100 comprises an image language model to generate image predictions and, optionally, word prediction(s). The image language model may be a generic image language model, for example a language model based on the English language, or may be an application-specific image language model, e.g. a language model trained on short message service messages or email messages, or any other suitable type of language model. The prediction engine 100 may comprise any number of additional language models, which may be text-only language models or an image language model.

If the prediction engine 100 comprises one or more additional language models, the predication engine 100 comprises a multi-language model (Multi-LM) to combine the image predictions and/or word predictions, sourced from each of the language models to generate final image predictions and/or final word predictions that may be provided to a user interface for display and user selection. The final image predictions are preferably a set (i.e. a specified number) of the overall most probable predictions.

If the additional language model is a standard word-based language model, it is used alongside the image-based language model, such that the prediction engine 100 generates an image prediction from the image language model and a word prediction from the word-based language model. If preferred, the image/word based language model may also generate word predictions which are used by the Multi-LM to generate a final set of word predictions. Since the additional language model of this embodiment can predict words only, the Multi-LM is not needed to output final image predictions. The word-based language model 104 of FIG. 1 may be replaced by any suitable language model for generating word predictions, which may include language models based on morphemes or word-segments.

If the additional language model 104 of FIG. 1 is an additional image language model, then the Multi-LM can be used to generate final image predictions from image predictions sourced from both language models. The Multi-LM may also be used to tokenise user inputted text.

An example of an image language model is now described. There are two possible inputs into a given language model, a current term input and a context input. The language model may use either or both of the possible inputs. The current term input comprises information the system has about the term the system is trying to predict, e.g. the word the user is attempting to enter (e.g. if the user has entered "I am working on ge", the current term input 11 is 'ge'). This could be a sequence of multi-character keystrokes, individual character keystrokes, the characters determined from a continuous touch gesture across a touch-screen keypad, or a mixture of input forms. The context input comprises the sequence of terms entered so far by the user, directly preceding the current term (e.g. "I am working"), and this sequence is split into 'tokens' by the Multi-LM or a separate tokenizer. If the system is generating a prediction for the nth term, the context input will contain the preceding n−1 terms that have been selected and input into the system by the user. The n−1 terms of context may comprise a single word, a sequence of words, or no words if the current word input relates to a word beginning a sentence. A language model may comprise an input model (which takes the current term input as input) and a context model (which takes the context input as input).

For example, the language model comprises a trie (an example of an input model) and a word-based n-gram map (an example of a context model) to generate word predictions from current input and context respectively. The language model comprises an intersection to compute a final set of word predictions from the predictions generated by the trie and n-gram map. The trie can be a standard trie or an approximate trie which is queried with the direct current word-segment input. Alternatively, the trie can be a probabilistic trie which is queried with a KeyPressVector generated from the current input. The language model can also comprise any number of filters to generate the final set of word predictions. If desired, the intersection of the language model is configured to employ a back-off approach if a candidate predicted by the trie has not been predicted by the n-gram map also, rather than retaining only candidates generated by both. Each time the system has to back-off on the context searched for, the intersection mechanism applies a 'back-off' penalty to the probability (which may be a fixed penalty, e.g. by multiplying by a fixed value). In this embodiment, the context model (e.g. the n-gram map) may comprise unigram probabilities with the back-off penalties applied.

In an example, the language model includes a word→image correspondence map, which maps each word of the language model to one or more relevant images/labels, e.g. if the word prediction is 'pizza', the language model outputs an image of a pizza (e.g. the pizza emoji) as the image prediction.

In some examples the word to image correspondence map is not needed since the n-gram map of the language model is trained on source data comprising images embedded in sections of text. In this case, the n-gram map the emojis are treated like words to generate the language model, i.e. the n-gram map comprises emojis in the context in which they have been identified. The n-gram map comprises the probabilities associated with sequences of words and emojis, where emojis and words are treated in the same manner. In some cases the n-gram map with emojis is used without the trie so that images are predicted without the need for the current input. In some cases the n-gram map with emojis is used with the trie so that the intersection is computed to yield the word predictions and the image predictions (without the need for the correspondence map).

In the case that a search engine is used as the prediction engine, the search engine has an image database comprising a statistical model associated with each image. The statistical models have been trained on sections of text associated with the particular image for that model. The statistical model is a text language model in some examples.

In some examples the prediction engine comprises a classifier which has been trained on text data that has been pre-labeled with images. Any suitable type of machine learning classifier may be used which identifies to which of a set of categories a new observation belongs, on the basis of a training set of data containing observations or instances whose category membership is known. In some cases a neural network classifier is used.

Figure 8:
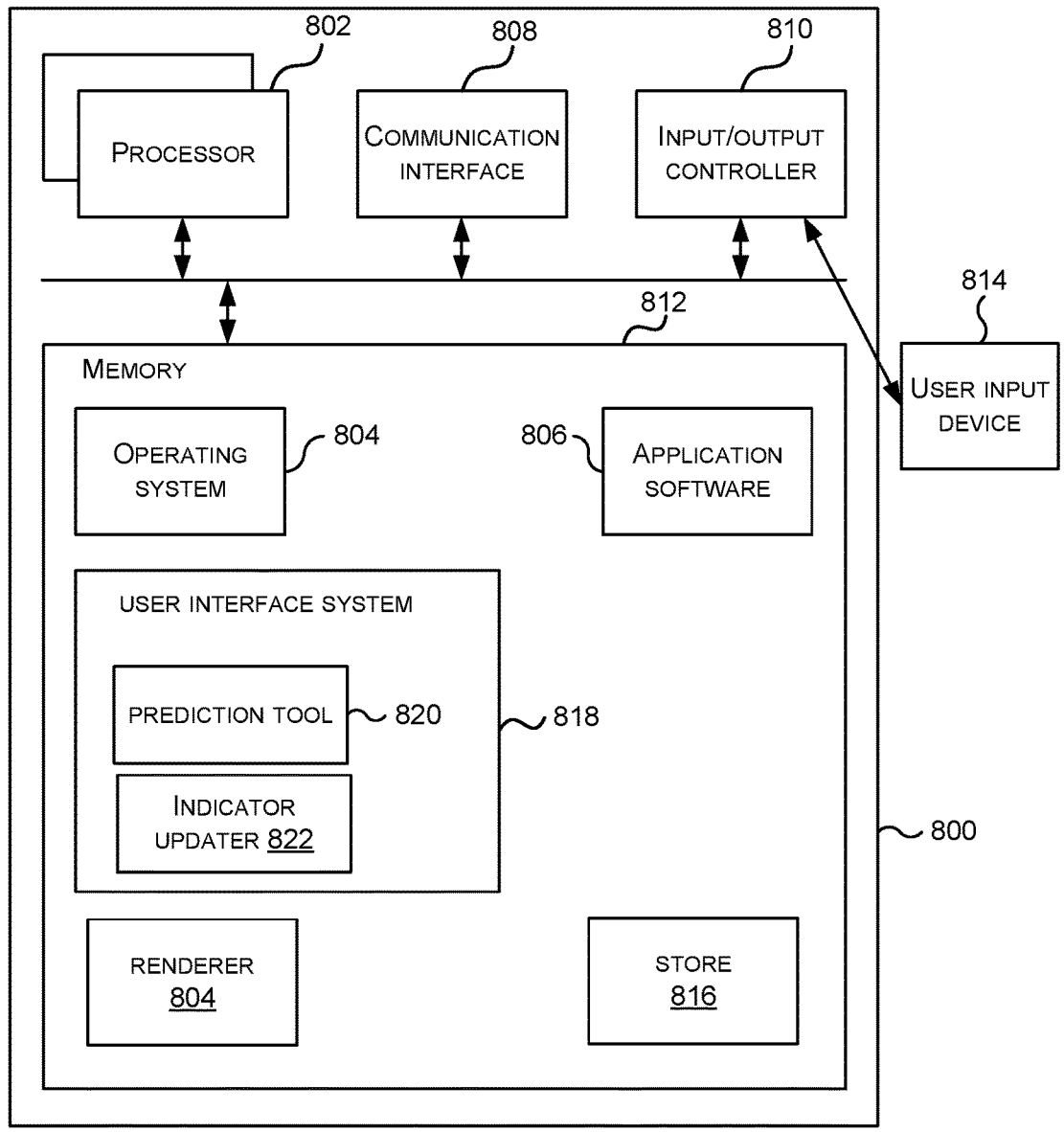
FIG. 8 illustrates an exemplary computing-based device in which embodiments of a computing device with input image suppression are implemented.

FIG. 8 illustrates various components of an exemplary computing-based device 800 which are implemented as any form of a computing and/or electronic device, and in which embodiments of a prediction tool 820 (such as prediction tool 312 of FIG. 3) and an indicator updater 822 (such as indicator updater 322 of FIG. 3) for controlling input of images to the computing-based device are implemented in some examples.

Computing-based device 800 comprises one or more processors 802 which are microprocessors, controllers or any other suitable type of processors for processing computer executable instructions to control the operation of the device in order to input images such as emojis to the device, where the images are relevant to text input by the user. In some examples, for example where a system on a chip architecture is used, the processors 802 include one or more fixed function blocks (also referred to as accelerators) which implement a part of the method of any of FIGS. 4 to 7 in hardware (rather than software or firmware). Platform software comprising an operating system 804 or any other suitable platform software is provided at the computing-based device to enable application software 806 to be executed on the device such as a messaging application, search application or other application software. The computing-based device has a user interface system 818 comprising a prediction tool 820 as described with reference to FIG. 3 and an indicator updater 822 as described with reference to FIG. 3 and FIG. 7. The computing-based device has a renderer 304 to render emojis and text and to render a graphical user interface. A store 816 holds indicator values, images, predictions, ranks, criteria and other data.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 812 it will be appreciated that the storage is, in some examples, distributed or located remotely and accessed via a network or other communication link (e.g. using communication interface 808).

The computing-based device 800 also comprises an input/output controller 810 arranged to output display information to a display device which may be separate from or integral to the computing-based device 800. The display information may provide a graphical user interface. The input/output controller 810 is also arranged to receive and process input from one or more devices, such as a user input device 814 (e.g. a mouse, keyboard, camera, microphone or other sensor). In some examples the user input device 814 detects voice input, user gestures or other user actions and provides a natural user interface (NUI). This user input may be used to select candidate images for input, input text, set criteria, configure rules and for other purposes. In an embodiment the display device also acts as the user input device 814 if it is a touch sensitive display device. The input/output controller 810 outputs data to devices other than the display device in some examples, e.g. a locally connected printing device.

Any of the input/output controller 810, display device and the user input device 814 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computing device comprising:

a memory storing at least one indicator of image use, where image use is entry of images to a computing device;

a user interface which receives user input;

a processor configured to trigger prediction, from the user input, of a plurality of candidate images for input to the computing device; and wherein the processor is configured to at least partially suppress availability of the candidate images for selection by a user, using the indicator of image use.

A computing device as described above wherein the at least one indicator of image use is a statistic describing at least observations of images input to the computing device.

A computing device as described above wherein the at least one indicator of image use is a statistic describing at least observations of candidate images available for selection by a user.

A computing device as described above wherein the at least one indicator of image use is any one or more of: user specific, application specific, field specific, time specific, recipient specific.

A computing device as described above wherein the processor is configured to dynamically compute the at least one indicator of image use during operation of the computing device.

A computing device as described above wherein the processor is configured to receive context about the user input and to select, using the context, the at least one indicator of image use from a plurality of indicators of image use.

A computing device as described above wherein the processor is configured to trigger prediction by sending details of the user input and the indicator of image use to a prediction engine and receiving in response the plurality of candidate images.

A computing device as described above wherein the processor is configured to at least partially suppress availability of the candidate images by inputting the at least one indicator to a prediction engine.

A computing device as described above wherein the processor is configured to suppress availability of the candidate images by switching off image prediction capability.

A computing device as described above wherein the processor is configured to at least partially suppress availability of the candidate images by filtering the candidate images.

A computing device as described above wherein the processor is configured to control availability of the candidate images by multiplying statistical values of the candidate images by a multiplier computed from the at least one indicator.

A computing device as described above wherein the at least one indicator is a ratio of observations of images input to the computing device to observations of candidate images available for selection by a user.

A computing device as described above wherein the user interface is a soft keyboard having text prediction and image prediction capability.

A computer-implemented method comprising:

storing at least one indicator of image use, where image use is entry of images to a computing device;

receiving user input;

triggering prediction, from the user input, of a plurality of candidate images for input to the computing device; and at least partially suppressing availability of the candidate images for selection by a user, using the indicator of image use.

A method as described above wherein the at least one indicator of image use is a statistic describing at least observations of images input to the computing device.

A method as described above wherein the at least one indicator of image use is a statistic describing at least observations of candidate images available for selection by a user.

A method as described above wherein the at least one indicator of image use is any one or more of: user specific, application specific, field specific, time specific, recipient specific.

A method as described above comprising dynamically computing the at least one indicator of image use during operation of the computing device.

A method as described above comprising receiving context about the user input and selecting, using the context, the at least one indicator of image use from a plurality of indicators of image use.

A method as described above comprising triggering prediction by sending details of the user input and the indicator of image use to a prediction engine and receiving in response the plurality of candidate images.

A method as described above comprising at least partially suppressing availability of the candidate images by inputting the at least one indicator to the prediction engine.

A method as described above comprising suppressing availability of the candidate images by switching off image prediction capability.

A method as described above comprising at least partially suppressing availability of the candidate images by filtering the candidate images.

A method as described above comprising controlling availability of the candidate images by multiplying statistical values of the candidate images by a multiplier computed from the at least one indicator.

A method as described above wherein the at least one indicator is a ratio of observations of images input to the computing device to observations of candidate images available for selection by a user.

A method as described above comprising implementing the user interface as a soft keyboard having text prediction and image prediction capability.

A computing device comprising:
means for storing at least one indicator of image use, where image use is entry of images to a computing device;
means for receiving user input;
means for triggering prediction, from the user input, of a plurality of candidate images for input to the computing device; and at least partially suppressing availability of the candidate images for selection by a user, using the indicator of image use.

For example, the means for storing at least one indicator of image use is the memory 812 of FIG. 8. For example the means for receiving user input is the user interface system 310 of FIG. 3 or the user interface system 818 of FIG. 8. For example, the means for triggering prediction is the prediction tool 820 of FIG. 8 or the prediction tool 312 of FIG. 3.

A computing device comprising:
a processor which implements a keyboard having text prediction and emoji prediction capability; and
a memory storing at least one indicator of emoji use; and
wherein the processor is configured to control the emoji prediction capability of the keyboard on the basis of the indicator.

A computer-implemented method comprising:
executing a keyboard having text prediction and emoji prediction capability;
storing at least one indicator of emoji use; and
controlling the emoji prediction capability of the keyboard on the basis of the indicator.

A computing device comprising:
means for executing a keyboard having text prediction and emoji prediction capability;
means for storing at least one indicator of emoji use; and
means for controlling the emoji prediction capability of the keyboard on the basis of the indicator.

For example, the means for executing a keyboard with prediction is the user interface and prediction tool 820 of FIG. 8 and the means for storing at least one indicator is memory 320 of FIG. 3 or memory 812 of FIG. 8. For example the means for controlling the emoji prediction capability is the prediction tool 820 of FIG. 8.

A computing device comprising:
a processor which implements a soft keyboard having text prediction and emoji prediction capability; and
a memory storing a plurality of applications executable on the computing device, the memory storing an application specific indicator of emoji use for each of the applications; and
wherein the processor is configured to automatically switch on or off the emoji prediction capability of the keyboard on the basis of the application specific indicators and an indication of which of the plurality of applications is currently in focus.

A computer-implemented method comprising:
executing a keyboard having text prediction and emoji prediction capability;
storing a plurality of applications executable on the computing device, and storing an application specific indicator of emoji use for each of the applications; and
automatically switching on or off the emoji prediction capability of the keyboard on the basis of the application specific indicators and an indication of which of the plurality of applications is currently in focus.

A computing device comprising:
means for executing a keyboard having text prediction and emoji prediction capability;
means for storing a plurality of applications executable on the computing device, and storing an application specific indicator of emoji use for each of the applications; and
means for automatically switching on or off the emoji prediction capability of the keyboard on the basis of the application specific indicators and an indication of which of the plurality of applications is currently in focus.

For example, the means for executing a keyboard with prediction is the user interface and prediction tool 820 of FIG. 8, the means for storing is the memory 812 of FIG. 8 and the means for automatically switching is the prediction tool 820 of FIG. 8.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A computing device comprising:
   a user interface which receives user input;
   a memory storing context-specific indicators of image use, where image use is entry of images to the computing device, each of the indicators of image use being a statistical representation of observed image use measuring how likely a user is to input an image into the user interface, the context-specific indicators being a combination of one or more of application-specific, user-specific, field-specific, enterprise-specific, recipient-specific, user-age-group-specific, user-gender-specific, topic-specific, population-specific, communication-specific, language-specific, geographical-region-specific, time-zone-specific, or time-of-year-specific indicators;
   a processor implementing a prediction tool with capability to predict, from the user input, candidate text and candidate images for input to the computing device,
   wherein the prediction tool is configured to select, based on context associated with the user input, at least one of the context-specific indicators of image use, and, if the selected at least one indicator of image use is below a threshold associated with rare usage, to automatically, without manual input from the user for adjusting prediction functionality of the prediction tool, suppress candidate image predictions available for selection by a user.

2. A computing device as claimed in claim 1 wherein the processor is configured to dynamically compute at least one of the indicators of image use during operation of the computing device.

3. A computing device as claimed in claim 1 wherein the prediction tool is configured to suppress the candidate image predictions by switching off the image prediction capability.

4. A computing device as claimed in claim 1 wherein the indicators comprise a ratio of observations of images input to the computing device to observations of candidate images available for selection by a user.

5. A computing device as claimed in claim 1 wherein the user interface is a soft keyboard having text prediction and image prediction capability.

6. A computer-implemented method comprising:
   storing context-specific indicators of image use, where image use is entry of images to a computing device, each of the indicators of image use being a statistical representations of observed image use measuring how likely a user is to input an image into the user interface, the context-specific indicators being a combination of one or more of application-specific, user-specific, field-specific, enterprise-specific, recipient-specific, user-age-group-specific, user-gender-specific, topic-specific, population-specific, communication-specific, language-specific, geographical-region-specific, time-zone-specific, or time-of-year-specific;
   receiving user input;
   selecting, based on context associated with the user input, at least one of the context-specific indicators of image use;

in response to the selected at least one indicator of image use being at or above a threshold associated with rare usage, triggering prediction, from the user input, of at least one of candidate text or a plurality of candidate images for input to the computing device; and in response to the selected at least one indicator of image use being below the threshold associated with rare usage, automatically, without manual input from the user for adjusting prediction functionality, suppressing candidate image predictions available for selection by a user.

7. A method as claimed in claim 6, comprising dynamically computing at least one of the indicators of image use during operation of the computing device.

8. A computing device comprising:

a processor which implements a soft keyboard having text prediction and emoji prediction capability and providing a user interface which receives user input; and a memory storing a plurality of applications executable on the computing device, the memory storing an application-specific indicator of emoji use for each of the applications, the application-specific indicators for the plurality of application being statistical representations of observed emoji use measuring how likely a user is to input an emoji into the user interface; and wherein the processor is configured to select, based on an application in focus when the user input is received, at least one of the application-specific indicators of emoji use, and, if the selected at least one indicator of emoji use is below a threshold associated with rare usage, to automatically switch off the emoji prediction capability of the keyboard.

\* \* \* \* \*